T. TEED.
Endless-Chain Propellers.
No. 143,793.  Patented Oct. 21, 1873.
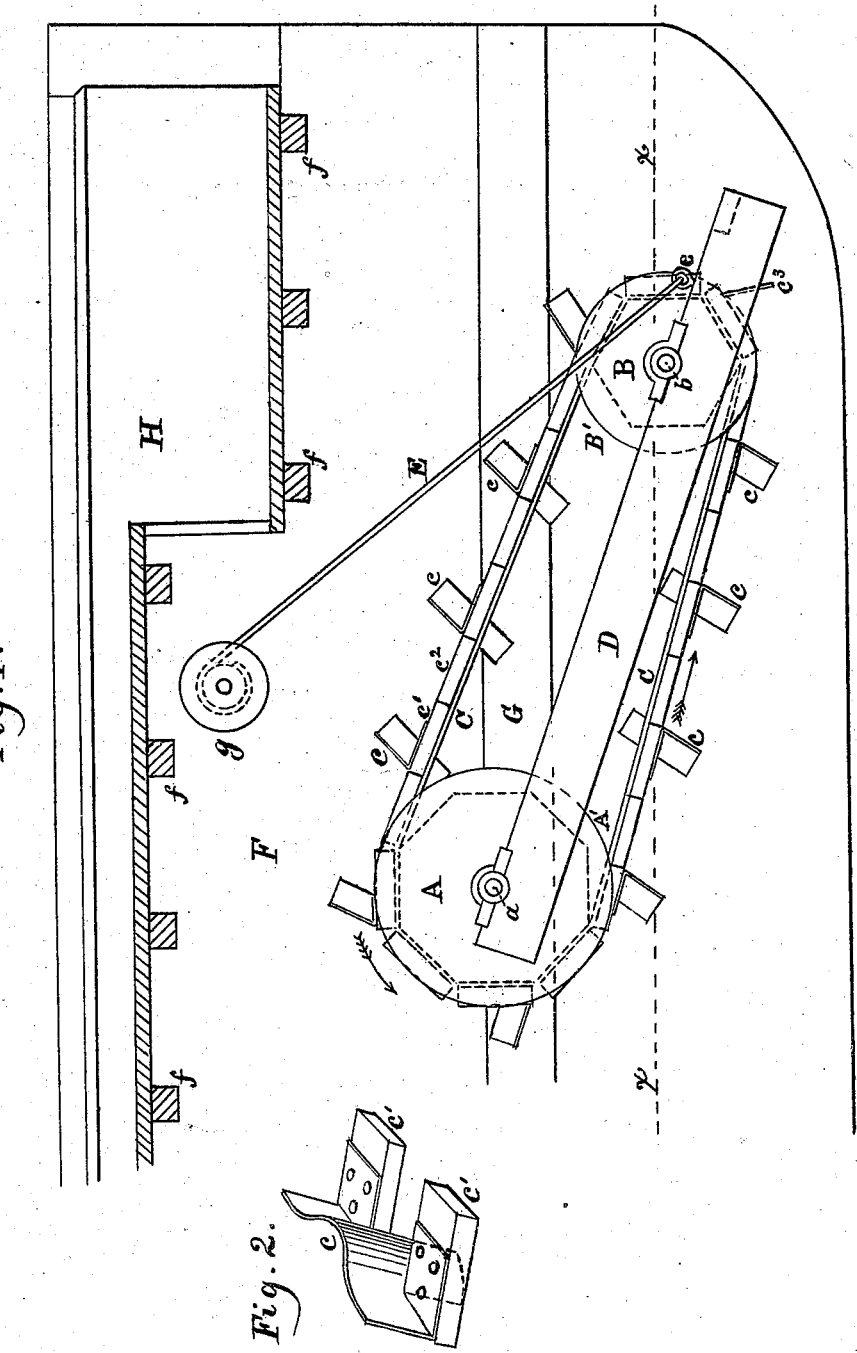

UNITED STATES PATENT OFFICE.

THEODORE TEED, OF ALEXANDRIA, VIRGINIA, ASSIGNOR OF ONE-HALF HIS RIGHT TO L. H. CHANDLER AND C. P. CULVER, OF WASHINGTON, DISTRICT OF COLUMBIA.

IMPROVEMENT IN ENDLESS-CHAIN PROPELLERS.

Specification forming part of Letters Patent No. 143,793, dated October 21, 1873; application filed March 28, 1873.

*To all whom it may concern:*

Be it known that I, THEODORE TEED, of Alexandria, county of Alexandria and State of Virginia, have invented certain Improvements in Apparatus for Propelling Boats, of which the following is a specification:

My invention relates to certain improvements made upon propelling apparatus for boats, consisting, essentially, of a long frame having two many sided or faced wheels revolving upon their respective axles journaled therein, one in each end, and of an endless belt made of links, the lengths of which correspond exactly with those of the faces of such wheels, such belt having fastened upon its outer surface, at regular intervals, paddles, which are designed to push against the water into which the lower side of the apparatus is submerged, when the belt is made to travel over the wheels by power applied to the axle of one of them, which is the one upon which the whole apparatus is hinged, in such a manner that the rear end may be raised or lowered to suit the depth of the water or the varying draft of the boat, accordingly as it may be heavily laden or otherwise. My invention relates particularly to setting and fastening the paddles upon the belt with such an inclination thereto that, in operation, each, with the surface of the belts, shall present an obtuse angle to the water, so as to produce a slight lifting action, as well as the propelling action; and, furthermore, in order that when each paddle is carried around the lower or hinder wheel it shall have such an inclination as to facilitate the shedding off of the water the moment it ceases to push and begins to lift. My invention relates, furthermore, to the peculiar form of the paddle itself, which is made with its pushing-surface concave, so that its right and left wings shall, to some extent, prevent the lateral flow of the water, and its central portion to extend down between the two equal parts of which the endless belt is composed. By this latter construction, the paddle is made longer, stronger, and of greater holding capacity.

In the accompanying drawings, Figure 1 represents a side view of the apparatus mounted in the inside of a chamber situated in the lateral center of the stern of a boat, and Fig. 2 is a perspective view of a paddle and two opposite links of the endless chain.

A B are the wheels; $a\, b$, their axles; D, long bearing-frame; A' B', the flanges upon the wheels to confine the belt; G, the bearing-beams to sustain the frame; $c'\, c'\, c'\, c'$, the links of the chain C.

The double form of the chain is shown in Fig. 2. The faces of the wheels are made equal in length, of course; but the lower or hinder wheel may be made much smaller and have fewer sides, and its being made so will result in preventing a waste of power, because, if that wheel were large, two or more paddles would be in position to lift and not to push at the same time.

The advantage of having the apparatus confined in a chamber is, that the agitation of the water is thus prevented from producing surface waves, which would tend to wear away and destroy the banks of the canal or watercourse. The apparatus may, however, be located in any part of the boat.

What I claim as my invention is—

The endless belt C, having the paddle $c\, c\, c\, c$, of the peculiar form and inclination shown and described, substantially as and for the purpose set forth.

THEODORE TEED.

Witnesses:
R. P. W. GARNETT,
S. M. ROBBINS.